US009074104B2

(12) United States Patent  
Chopra et al.

(10) Patent No.: US 9,074,104 B2  
(45) Date of Patent: Jul. 7, 2015

(54) INKS COMPRISING AMORPHOUS UREAS

(71) Applicant: XEROX CORPORATION, Norwalk, CT (US)

(72) Inventors: Naveen Chopra, Oakville (CA); Adela Goredema, Mississauga (CA); Nathan M. Bamsey, Burlington (CA); Biby Abraham, Mississauga (CA); Gabriel Iftime, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 129 days.

(21) Appl. No.: 14/018,334

(22) Filed: Sep. 4, 2013

(65) Prior Publication Data

US 2015/0059615 A1   Mar. 5, 2015

(51) Int. Cl.
*C09D 11/02* (2014.01)
*C09D 11/34* (2014.01)

(52) U.S. Cl.
CPC ..................... *C09D 11/34* (2013.01)

(58) Field of Classification Search
CPC ....................................................... C09D 11/34
See application file for complete search history.

(56) References Cited

U.S. PATENT DOCUMENTS

| | | | |
|---|---|---|---|
| 5,231,135 A | 7/1993 | Machell | |
| 5,621,022 A | 4/1997 | Jaeger | |
| 6,221,137 B1 | 4/2001 | King | |
| 6,472,523 B1 | 10/2002 | Banning | |
| 6,476,219 B1 | 11/2002 | Duff | |
| 6,576,747 B1 | 6/2003 | Carlini | |
| 6,576,748 B1 | 6/2003 | Carlini | |
| 6,590,082 B1 | 7/2003 | Banning | |
| 6,646,111 B1 * | 11/2003 | Carlini et al. | 534/649 |
| 6,663,703 B1 | 12/2003 | Wu | |
| 6,673,139 B1 * | 1/2004 | Wu et al. | 106/31.29 |
| 6,696,552 B2 | 2/2004 | Mayo | |
| 6,713,614 B2 | 3/2004 | Carlini | |
| 6,726,755 B2 | 4/2004 | Titterington | |
| 6,755,902 B2 | 6/2004 | Banning | |
| 6,821,327 B2 * | 11/2004 | Jaeger et al. | 106/31.29 |
| 6,958,406 B2 | 10/2005 | Banning | |
| 7,053,227 B2 * | 5/2006 | Jaeger et al. | 552/247 |
| 7,381,831 B1 | 6/2008 | Banning | |
| 7,427,323 B1 * | 9/2008 | Birau et al. | 106/497 |

* cited by examiner

*Primary Examiner* — Veronica F Faison  
(74) *Attorney, Agent, or Firm* — Pillsbury Winthrop Shaw Pittman LLP

(57) ABSTRACT

A phase change ink includes a crystalline component and an amorphous component, the amorphous component including a branched alkyl core and a urea functional group.

19 Claims, 3 Drawing Sheets

INKS COMPRISING AMORPHOUS UREAS

BACKGROUND

Embodiments disclosed herein relate to ink compositions. More particularly, embodiments disclosed herein relate to amorphous ureas used in phase change inks comprising mixtures of amorphous and crystalline components.

Phase change inks are desirable for ink jet printers because they remain in a solid phase at room temperature facilitating shipping, long term storage, and the like. In addition, the problems associated with nozzle clogging as a result of ink evaporation with conventional liquid ink jet inks are largely eliminated, thereby improving the reliability of the ink jet printing. Further, in phase change ink jet printers the ink droplets are applied directly onto the final recording medium, while the droplets solidify almost immediately upon contact so that migration of ink along the printing medium is prevented and dot quality is improved.

Numerous phase change inks may employ a mixture of crystalline and amorphous components. The crystalline material may impart a hardness and rapid phase change. The amorphous material, typically a viscous, tacky material, may aid in adhesion to the substrate and may help plasticize the crystalline component to prevent embrittlement and cracking of the printed image. Many amorphous materials that have been employed as the amorphous component of phase change inks comprise ester functional groups. However, esters are prone to hydrolysis which may compromise the properties of the formulated phase change ink. Other issues of current phase change inks that may arise in currently employed amorphous components include lack of thermal stability and/or insufficient ability to confer rub resistance to the printed image.

SUMMARY

Figure 1:
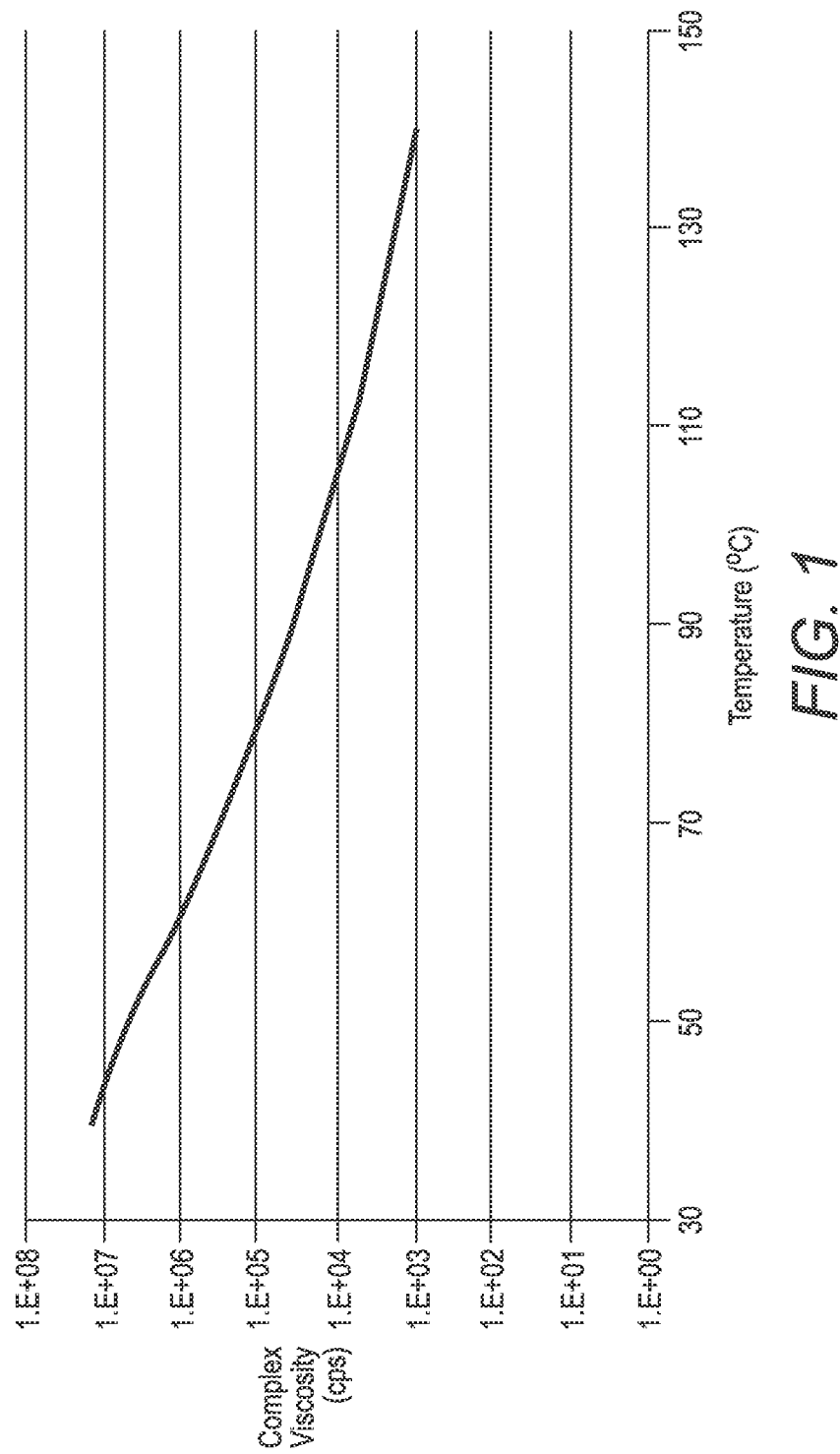
FIG. 1 shows a plot of viscosity versus temperature of an exemplary amorphous component (Sample 1, isoamyl) comprising urea functional groups.

In some aspects, embodiments disclosed herein provide phase change inks comprising a crystalline component and an amorphous component, wherein the amorphous component comprises a branched alkyl core and a urea functional group.

In some aspects, embodiments disclosed herein provide phase change inks comprising a crystalline component and a urea component, wherein the urea component comprises a branched alkyl core and a urea functional group, wherein a degree of branching of the branched alkyl core is sufficient to provide the urea component that is amorphous.

In some aspects, embodiments disclosed herein provide phase change inks comprising a crystalline component and an amorphous component, wherein the amorphous component comprises a branched alkyl core and a urea functional group and wherein the amorphous component has a glass transition temperature in a range from about −15° C. to about 30° C.

DETAILED DESCRIPTION

Crystalline-amorphous phase change inks may display improved robustness over alternative conventional liquid-based inks, especially on coated substrates with respect to scratch, fold and fold offset. Thus far, numerous amorphous and crystalline component combinations have been developed. For example, one amorphous component derived from L-tartaric acid/cyclohexanol/tBu cyclohexanol (TBCT) can provide images with acceptable robustness. However, TBCT suffers from several disadvantages, namely thermal stability during synthesis and variation in product distributions, both of which pose challenges for scale-up synthesis. Furthermore, inks containing TBCT may fall short in providing optimal rub resistance for finishing.

Embodiments disclosed herein provide inks comprising amorphous ureas that may replace esters such as TBCT. Amorphous ureas disclosed herein may be particularly useful given their physical properties. Ureas are generally strong hydrogen bonding compounds exhibiting the strongest hydrogen bonding in the functional group series of carbonates, esters, urethanes, and amides. Moreover, ureas are less prone to hydrolysis among the functional groups in the same series. The strong hydrogen bonding of simple ureas may provide higher than desirable viscosities. However, embodiments disclosed herein provide ureas as amorphous components with attenuated viscosities by employing combinations of branched alkyl cores and small molecule amines as building blocks.

In an exemplary embodiment, a bis-urea can be prepared by reaction of 2,2,4-trimethyl hexamethylenediisocyanate (TMHDI) with various amines. The resultant bis-ureas can be formulated with crystalline materials, such as N-phenylethyl benzamide (N-PEB). As demonstrated herein below, such ink formulations provided print samples with improved robustness as measured by scratch, fold, and fold offset compared to conventional phase change inks. Moreover, inks disclosed herein comprising the urea-based amorphous component show superior rub resistance compared to conventional phase change inks. These and other advantages will be apparent to those skilled in the art.

The phase change ink compositions disclosed herein are characterized by being solid at room temperature (e.g., 20-27° C.) and molten at an elevated temperature at which the molten ink is applied to a substrate. While current ink options are successful for porous paper substrates, these options are not always satisfactory for coated paper substrates.

It has been discovered that using a mixture of crystalline and amorphous components in phase change ink formulations provides robust inks, and in particular, phase change inks which demonstrate robust images on uncoated and coated paper. For crystalline materials, small molecules generally tend to crystallize when solidifying and low molecular weight organic solids are generally crystalline. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature 140° C.). In the present embodiments, however, it is discovered that a robust phase change ink can be obtained through a blend of crystalline and amorphous components.

In embodiments, there are provided phase change ink compositions which comprise a blend of (1) crystalline and (2) amorphous components, generally in a weight ratio of from about 60:40 to about 95:5, respectively. In more specific embodiments, the weight ratio of the crystalline to amorphous component is from about 65:35 to about 95:5, or is from about 70:30 to about 90:10. In one embodiment, the weight ratio is 70:30 for the crystalline and amorphous components, respectively. In another embodiment, the weight ratio is 80:20 for the crystalline and amorphous components, respectively. In particular embodiments, a ratio of the crystalline component to amorphous components ranges from about 9:1 to about 2:1.

less than 55° C. The melting point must be below 150° C., which is the upper limit of the jetting temperature, or preferably below from about 145 to about 140° C. The melting point is preferably above 65° C. to prevent blocking and print transfer upon standing at temperatures up to 65° C., or more preferably above about 66° C. or above about 67° C. Examples of suitable crystalline materials are illustrated in Table 1.

TABLE 1

| Compound | Structure | $T_{melt}$ (° C.)* | $T_{crys}$ (° C.)* | ΔT (° C.) | η @ 140° C. (cps)** | η @ RT (cps)** |
|---|---|---|---|---|---|---|
| 1 | | 110 | 83 | 27 | 4.7 | >10$^6$ |
| 2 | | 98 | 71 | 27 | 2.9 | >10$^6$ |
| 3 | | 119 | 80 | 39 | 3.3 | >10$^6$ |
| 4 | | 125 | 75 | 50 | 3.0 | >10$^6$ |
| Target | | <140° C. | >65° C. | ≤55° C. | <10 cps | >10$^6$ cps |

*The samples were measured on a Q1000 Differential Scanning Calorimeter (TA Instruments) at a rate of 10° C./min from −50° C. to 200° C. to −50° C.; midpoint values are quoted.
**The samples were measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

Each component imparts specific properties to the phase change inks, and the blend of the components may provide inks that exhibit excellent robustness on uncoated and coated substrates. The crystalline component in the ink formulation may drive the phase change through rapid crystallization on cooling. The crystalline component may also set up the structure of the final ink film and creates a hard ink by reducing the tackiness of the amorphous component. The crystalline components exhibit crystallization, relatively low viscosity (≤10$^1$ centipoise (cps), or from about 0.5 to about 10 cps, or from about 1 to about 10 cps) at about 140° C. and high viscosity (>10$^6$ cps) at room temperature. Because the crystalline components dictate the phase change of the ink, rapid crystallization is required to allow further immediate print processing if required (i.e., spreading, duplex printing, etc.) and to prevent excessive showthrough on uncoated substrates. By differential scanning calorimetry (DSC) (10° C./min from −50 to 200 to −50° C.), desirable crystalline components show sharp crystallization and melting peaks, and the ΔT between them is The amorphous components provide tackiness and impart robustness to the printed ink. In the present embodiments, desirable amorphous materials have relatively low viscosity (<10$^2$ cps, or from about 1 to about 100 cps, or from about 5 to about 95 cps) at about 140° C., but very high viscosity (>10$^5$ cps) at room temperature. The low viscosity at 140° C. provides wide formulation latitude while the high viscosity at room temperature imparts robustness. The amorphous materials have Tg's (glass transition temperatures) but do not exhibit crystallization and melting peaks by DSC (10° C./min from −50 to 200 to −50° C.). The Tg values are typically from about 10 to about 50° C., or from about 10 to about 40° C., or from about 10 to about 35° C., to impart the desired toughness and flexibility to the inks. The selected amorphous materials have low molecular weights, such as less than 1000 g/mol, or from about 100 to about 1000 g/mol, or from about 200 to about 1000 g/mol, or from about 300 to about 1000 g/mol. Higher molecular weight amorphous materials such as polymers become viscous and sticky liquids at high temperatures, but have viscosities that are too high to be jettable with piezoelectric printheads at desirable temperatures. Suitable amorphous components disclosed herein are based on ureas having a branched alkyl core.

In embodiments, there are provided phase change inks comprising a crystalline component and an amorphous component, wherein the amorphous component comprises a branched alkyl core and a urea functional group. In embodiments, the amorphous component comprises at least two urea functional groups.

As used herein, the term "crystalline" has its ordinary meaning. That is, a compound that is a solid having long range order that is characteristic of a crystal. Thus, crystalline compounds disclosed herein have they constituent molecules arranged in a periodic or regular array. By contrast, "amorphous" as used herein refers to solid compounds lacking long range order. In embodiments, "amorphous" is also intended to refer to compounds having amorphous domains while they may also include some domains of structural order. Such compounds are known in the art as semicrystalline.

In embodiments, the amorphous component comprises a compound of formula I:

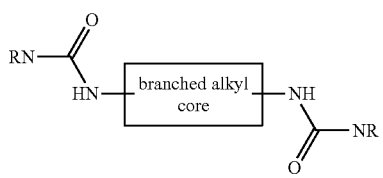

wherein each R is independently selected from a $C_1$ to $C_6$ branched or straight chain alkyl. Exemplary $C_1$ to $C_6$ branched or straight chain alkyls include methyl, ethyl, n-propyl, isopropyl, n-butyl, sec-butyl, t-butyl, n-amyl, isoamyl, sec-amyl, t-amyl, neopentyl, 3-pentyl, n-hexyl, sec-hexyl, isohexyl, tert-hexyl, and so on. In general, the branched alkyl core may comprise any number of carbon atoms from about $C_4$ to about $C_{20}$. Branching of the alkyl core structure may be used to tune the degree of amorphous character and to modulate viscosity of the amorphous components. As disclosed herein, it was recognized that the urea functional group with its strong hydrogen bonding capacity might provide prohibitively high viscosities and/or crystalline character. In accordance with embodiments disclosed herein, the branched alkyl core serves as a means to reduce viscosity and increase the amorphous character of the amorphous component.

In embodiments the compound of formula I is further defined by formula II:

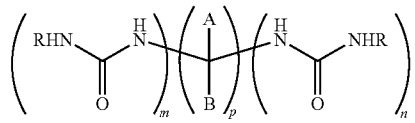

wherein m and n are the integers 0 or 1, provided that both m and n are not both 0;
p is an integer from 2 to 8; and each occurrence of A and B are independently selected from the group consisting of hydrogen, methyl, and ethyl, provided that at least one occurrence of A or B is not hydrogen. In particular embodiments, m and n are each 1. In embodiments, A and B combine to provide at least 2 non-hydrogen groups, or at least 3 non-hydrogen groups, or at least 4 non-hydrogen groups.

In embodiments, the compound of formula I is further defined by formula III:

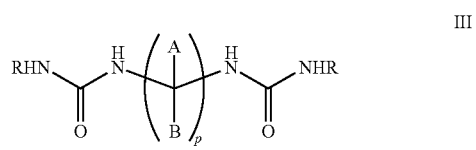

wherein p is an integer from 4 to 6.

In embodiments, in structures I-III each R may be isoamyl.
In embodiments, in structures I-III each R may be tert-pentyl.
In embodiments, in structures I-III each R may be n-butyl.
In embodiments, in structures I-III each R may be n-propyl.
In embodiments, in structures I-III each R may be sec-butyl.

In embodiments there are provided phase change inks comprising a crystalline component and a urea component, wherein the urea component comprises a branched alkyl core and a urea functional group, wherein a degree of branching of the branched alkyl core is sufficient to provide the urea component as an amorphous structure. In embodiments, the branched alkyl core has 1, 2, 3, 4, 5, or more points of branching. The branching need not be ordered in any periodic manner, although for simplicity of preparation, where the branched alkyl core is constructed de novo, symmetry or regular structural features may facilitate synthesis. In some embodiments the urea component comprises two urea functional groups. In such embodiments, the two urea functionalities may be situated at the termini of the molecule.

In particular embodiments, the urea component comprises a compound of formula IV:

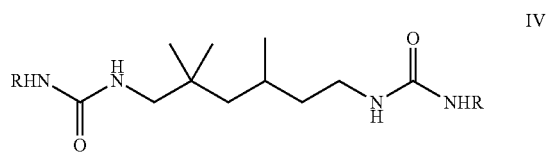

and/or its 2,4,4 isomer:

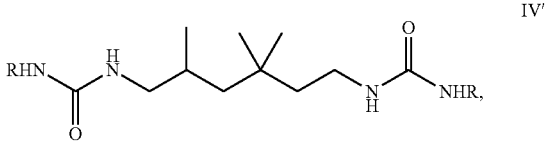

wherein each R is independently selected from a $C_1$ to $C_6$ branched or straight chain alkyl. In such embodiments, the branched alkyl core is based on reaction of 2,2,4-trimethylhexanediisocyanate (TMHDI, typically commercially available as a mixtures of IV and IV') with an appropriate amine ($RNH_2$). In embodiments, each R is isoamyl. In other embodiments, each R is n-propyl. It will be appreciated by those skilled in the art that these exact compounds are merely exemplary and provide proof of concept for the ability to create amorphous bis-ureas and that such compounds are useful when formulated as the amorphous component of a phase change ink comprising a crystalline and amorphous component, in accordance with the Examples provided herein below. Other branched alkyl cores may be employed in accordance with embodiments disclosed herein. In embodiments, a branched alkyl core may also embrace intervening cycloalkyl, i.e., cycloaliphatic groups, which may also be optionally substituted with methyl or ethyl groups. For example, in embodiments, the core of an amorphous component may be based on reaction of amines ($RNH_2$) with 4,4'-dicyclohexylmethane-diisocyanate, 3-isocyanatomethyl-3,5,5-trimethyl-cycohexylisocyanate (isophorone-based), and the like.

In embodiments there are provided phase change inks comprising a crystalline component and an amorphous component, wherein the amorphous component comprises a branched alkyl core and a urea functional group and wherein the amorphous component has a glass transition temperature in a range from about −15° C. to about 30° C.

In exemplary embodiments, such amorphous components having this range of glass transition temperatures may comprise a compound of formula IV/IV' (based on the 2,2,4-trimethylhexyl core shown above) wherein each R is independently selected from a $C_1$ to $C_6$ branched or straight chain alkyl. In particular embodiments each R is isoamyl, and in other embodiments each R is n-propyl.

In embodiments, the resulting ink has a melting point of from about 65 to about 150° C., or from about 70 to about 140° C., or from about 80 to about 135° C. In embodiments, the resulting ink has a crystallization point of from about 40 to about 140° C., or from about 45 to about 130° C., or from about 50 to about 120° C. In further embodiments, the resulting ink has a viscosity of from about 1 to about 22 cps, or from about 4 to about 15 cps, or from about 6 to about 12 cps at about 140° C. At room temperature, the resulting ink has a viscosity of about $10^6$ cps.

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis (4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

In embodiments, the phase change ink compositions described herein also include a colorant. The ink of the present embodiments can thus be one with or without colorants. The phase change ink may optionally contain colorants such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives.

In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade BV); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

In embodiments, solvent dyes are employed. An example of a solvent dye suitable for use herein may include spirit soluble dyes because of their compatibility with the ink carriers disclosed herein. Examples of suitable spirit solvent dyes include Neozapon Red 492 (BASF); Orasol Red G (Pylam Products); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow 5RA EX (Classic Dyestuffs); Orasol Black RLI (BASF); Orasol Blue GN (Pylam Products); Savinyl Black RLS (Clariant); Morfast Black 101 (Rohm and Haas); Thermoplast Blue 670 (BASF); Savinyl Blue GLS (Sandoz); Luxol Fast Blue MBSN (Pylam); Sevron Blue 5GMF (Classic Dyestuffs); Basacid Blue 750 (BASF); Keyplast Blue (Keystone Aniline Corporation); Neozapon Black X51 (C.I. Solvent Black, C.I. 12195) (BASF); Sudan Blue 670 (C.I. 61554) (BASF); Sudan Yellow 146 (C.I. 12700) (BASF); Sudan Red 462 (C.I. 260501) (BASF), mixtures thereof and the like.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications.

The inks described herein are further illustrated in the following examples. All parts and percentages are by weight unless otherwise indicated. The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

EXAMPLE 1

This Example shows the preparation and characterization of amorphous bis-ureas based on a TMHDI-based branched alkyl core.

Synthesis of Amorphous TMHDI-Based Bis-Ureas 2,2,4-trimethyl hexamethylenediisocyanate, TMHDI, available from Evonik Corporation as VESTANAT® TMDI is used as the branched alkyl core material. The material exists as a 1:1 mixture of 2,2,4 and 2,4,4 isomers. For simplicity, only the 2,2,4 isomer is shown. TMHDI was reacted with 2 equivalents of various small molecule amines to make the bis-ureas according to Scheme 1 below.

Scheme 1

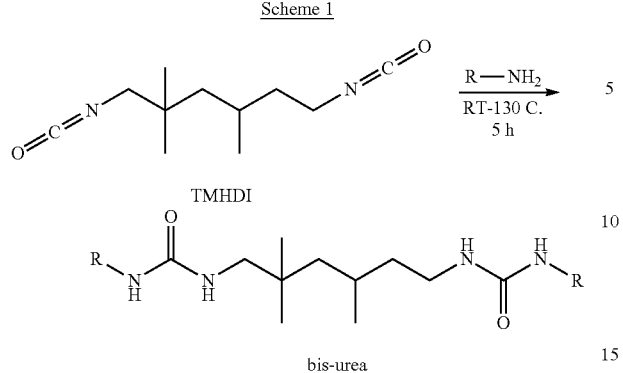

Sample (1) (isoamylamine, R=CH₂CH₂CH(CH₃)₂): To a 16 oz. jar equipped with magnetic stir was charged 40 g isoamylamine (MW=87, 0.46 moles). With stirring at room temperature 50.7 g TMHDI (MW=210, 0.24 moles, 1.05% excess) was slowly added dropwise, to maintain the temperature below the boiling point of the amine material. After the addition was completed, the mixture was heated in a 130° C. oil bath for one hour. A small sample was taken to run an infrared (IR) spectrum to monitor progress. The IR showed a small isocyanate peak based on excess of TMHDI. A small amount of butanol was added to quench the excess TMHDI. Subsequent IR of a sample indicated that no isocyante remained.

Sample (2) tert-pentylamine, R=C(CH₃)₂CH₂CH₃, was prepared in a similar fashion to Sample (1), except the amine used was tert-pentylamine.

Sample (3) n-butylamine, R=C₄H₉, was prepared in a similar fashion to (1), except the amine used was n-butylamine and toluene was added as a co-solvent due to the volatility off the amine. The toluene was removed by vacuum distillation once the reaction was complete.

Sample (4) n-propylamine, R=C₃H₇, was prepared in a similar fashion to (3), except the amine used was n-propylamine.

Sample (5) sec-butylamine, R=CH(CH₃)CH₂CH₃, was prepared in a similar fashion to (3), except the amine used was sec-butylamine.

Materials Properties

Figure 2:
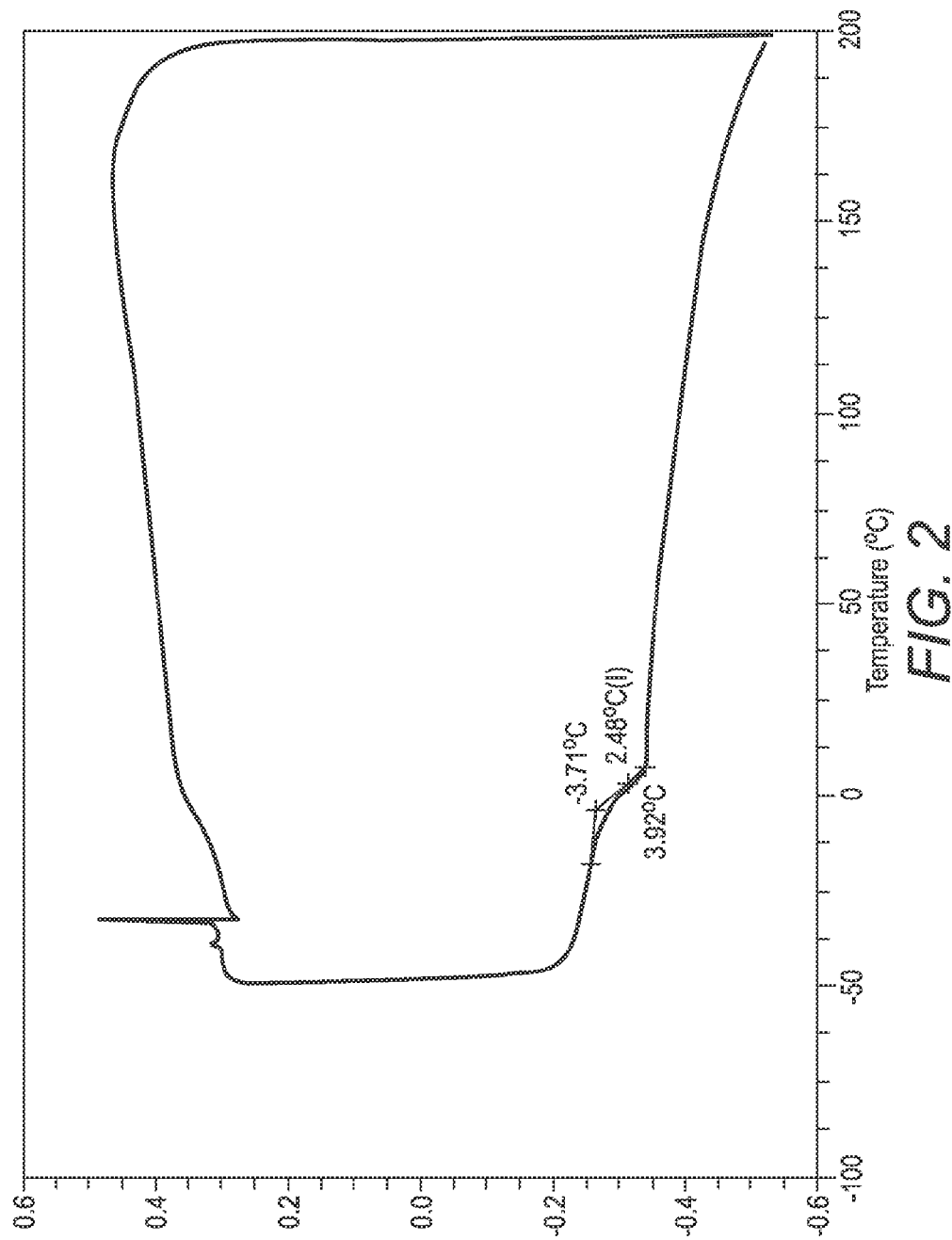
FIG. 2 shows a differential scanning calorimetry (DSC) trace of an amorphous component (Sample 1, isoamyl) comprising urea functional groups.

The viscosities and thermal analyses of Samples (1)-(5) were measured. FIGS. 1 and 2 show data for Sample (1). The rheology trace is consistent with an amorphous compound, and DSC showed a $T_g$ (glass transition temperature) of 2.48° C. Table 2 below summarizes the properties of the amorphous bis-urea, Samples (1)-(5).

TABLE 2

| Sample (#) | R | Tg/° C. | Viscosity @ 140° C. (cps) |
|---|---|---|---|
| 1 | isoamyl | 2.48 | 907 |
| 2 | tert-pentyl | 28.4 | 5.119 |
| 3 | n-butyl | −12.07 | 276 |
| 4 | n-propyl | 6.23 | 222 |
| 5 | sec-butyl | 15.3 | 1.448 |

EXAMPLE 2

This Example shows the preparation and characterization of inks incorporating amorphous bis-ureas based on a TMHDI-based branched alkyl core according to Example 1.

Ink Formulations

Five inks containing amorphous bis-urea Samples (1)-(5) were prepared in using N-phenylethylbenzamide (N-PEB) as the crystalline material and Cyan pigment dispersion in TBCT vehicle. The formulations are summarized below:

Ink Formulation 1

| Component | wt % | m (g) |
|---|---|---|
| N-phenylethyl benzamide (N-PEB crystalline) | 76.46 | 3.82 |
| Sample (1) | 10.14 | 0.51 |
| Pigment concentrate B4G/TBCT | 13.4 | 0.67 |
| TOTAL | 100.00 | 5.0 |

Ink Formulation 2

| Component | wt % | m (g) |
|---|---|---|
| N-phenylethyl benzamide (N-PEB crystalline) | 76.46 | 3.82 |
| Sample (2) | 10.14 | 0.51 |
| Pigment concentrate B4G/TBCT | 13.4 | 0.67 |
| TOTAL | 100.00 | 5.0 |

Ink Formulation 3

| Component | wt % | m (g) |
|---|---|---|
| N-phenylethyl benzamide (N-PEB crystalline) | 76.46 | 3.82 |
| Sample (3) | 10.14 | 0.51 |
| Pigment concentrate B4G/TBCT | 13.4 | 0.67 |
| TOTAL | 100.00 | 5.0 |

Ink Formulation 4

| Component | wt % | m (g) |
|---|---|---|
| N-phenylethyl benzamide (N-PEB crystalline) | 76.46 | 3.82 |
| Sample 4 | 10.14 | 0.51 |
| Pigment concentrate B4G/TBCT | 13.4 | 0.67 |
| TOTAL | 100.00 | 5.0 |

Ink Formulation 5

| Component | wt % | m (g) |
|---|---|---|
| N-phenylethyl benzamide (N-PEB crystalline) | 76.46 | 3.82 |
| Sample (5) | 10.14 | 0.51 |
| Pigment concentrate B4G/TBCT | 13.4 | 0.67 |
| TOTAL | 100.00 | 5.0 |

Ink Properties

Figure 3:
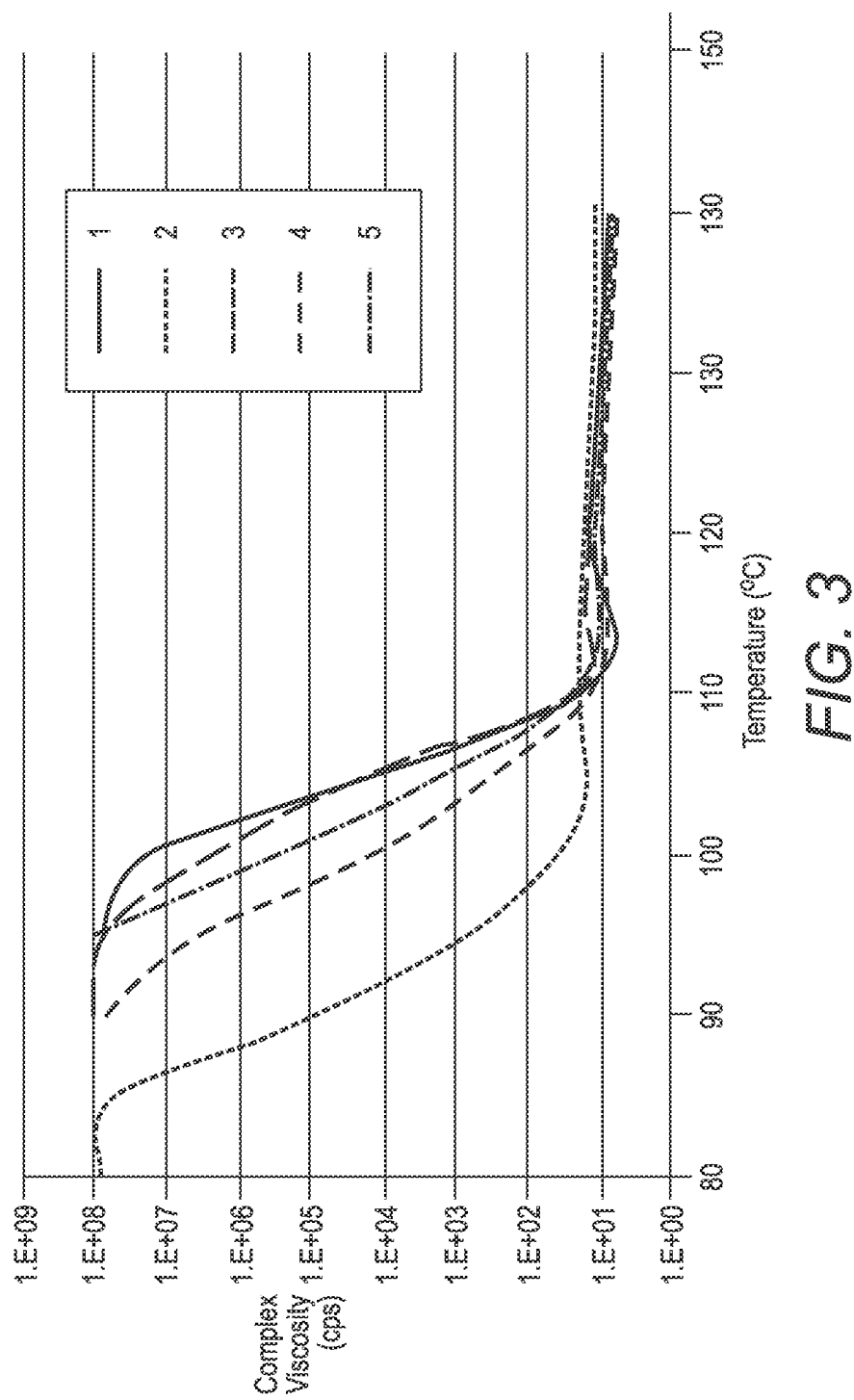
FIG. 3 shows a plot of viscosity versus temperature for exemplary inks 1-5 incorporating an amorphous component (Samples 1-5) comprising urea functional groups.

Ink rheology was measured for all five inks, with one example shown in FIG. 3. Table 3 indicates that tested ink formulations have the appropriate viscosity at 140° C. for jetting (i.e., about 10 cps).

TABLE 3

| Ink # | Viscosity @ 140° C. (cps) |
|---|---|
| 1 | 6.67 |
| 2 | 10.7 |
| 3 | 5.78 |
| 4 | 9.7 |
| 5 | 6.96 |

These results highlight the benefit of the branched alkyl core exemplified by THMDI. Typically urea compounds are very viscous owing to their extended hydrogen bonding. Without being bound by theory, it is postulated that providing branching, by way of the trimethylhexyl core, packing is disrupted, and the material is amorphous in nature. Furthermore, the hydrogen bonding may be counter-balanced to modulate viscosity. By contrast, linear chain bis-urea molecules are often characterized as high melting crystalline compounds, due to the ability of the linear chains to pack together tightly in an ordered fashion.

Robustness Tests

To test the robustness of prints, Ink 1-3 were printed onto Xerox® Digital Color Elite Gloss, 120 gsm (DCEG) coated papers using the K-proofer gravure printing plate, which was rigged with a pressure roll set at low pressure. The gravure plate temperature was set at 142° C., but the actual plate temperature was about 134° C. The K-proofer apparatus (manufactured by RK Print Coat Instrument Ltd., Litlington, Royston, Heris, SG8 0OZ, U.K.) is a useful printing tool to screen a variety of inks at small scale and to assess image quality on various substrates. The inks gave robust images that could not be easily removed from the substrates. When a metal tip with a curved tip at an angle of about 15° from vertical, with a weight of 528 g applied, was drawn across the image at a rate of approximately 13 mm/s no ink was visibly removed from the image. The tip is similar to a lathe round nose cutting bit with radius of curvature of approximately 12 mm.

Print Characterization

Ink 1 was scaled up to 175 g scale and printed with a test printer. The ink gave robust images that could not be easily removed from the substrates. When a metal tip with a curved tip at an angle of about 15° from vertical, with a weight of 528 g applied, was drawn across the image at a rate of approximately 13 mm/s no ink was visibly removed from the image. The tip is similar to a lathe round nose cutting bit with radius of curvature of approximately 12 mm.

Time Resolved Optical Microscopy (TROM) Results

Three printed inks (Inks 1-3) were tested for rates of crystallization using TROM, a test developed to mimic the solidification time on a printed substrate. In order to evaluate the suitability of a test ink for fast printing a quantitative method for measuring the rates of crystallization of solid inks containing crystalline components was developed. TROM (Time-Resolved Optical Microscopy) enables comparison between various test samples and, as a result, is a useful tool for monitoring the progress made with respect to the design of fast crystallizing inks.

TROM is described in co-pending U.S. patent application Ser. No. 13/456,847 entitled "TROM Process for Measuring the Rate of Crystallization of Solid Inks" to Gabriel Iftime et al., electronically filed on the same day herewith.

Time Resolved Optical Microspopy TROM monitors the appearance and the growth of crystals by using Polarized Optical Microscopy (POM). The sample is placed between crossed polarizers of the microscope. Crystalline materials are visible because they are birefringent. Amorphous materials or liquids, similar to, for example, inks in their molten state that do not transmit light, appear black under POM. Thus, POM enables an image contrast when viewing crystalline components and allows for pursuing crystallization kinetics of crystalline-amorphous inks when cooled from the molten state to a set-temperature. Polarized optical microscopy (POM) enables exceptional image contrast when viewing crystalline components.

In order to obtain data that allow comparison between different and various samples, standardized TROM experimental conditions were set, with the goal of including as many parameters relevant to the actual printing process. The ink or ink base is sandwiched between 16-25 mm circular thin glass slides. The thickness of the ink layer is kept at 5-25 μm (controlled with fiberglass spacers) which is close to actual printed ink layers. For rate of crystallization measurement, the sample is heated to the expected jetting temperature (viscosity of about 10-12 cps) via an offline hotplate and then transferred to a cooling stage coupled with an optical microscope. The cooling stage is thermostated at a preset temperature which is maintained by controlled supply of heat and liquid nitrogen. This experimental set-up models the expected drum/paper temperature onto which a drop of ink would be jetted in real printing process (40° C. for the experiments reported in this disclosure). Crystal formation and growth is recorded with a camera.

Table 4 below summarizes the TROM results collected in the manner described above.

TABLE 4

| Ink Formulation | T test (° C.) | time crys onset (s) | time crys elapsed (s) | time crys total (s) |
|---|---|---|---|---|
| 1 | 140 | 3 | 5 | 8 |
| 2 | 140 | 2 | 5 | 7 |
| 3 | 140 | 2 | 6 | 8 |

The results indicate that the ink solidification time is in an acceptable range in accordance with known robust phase change inks.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

What is claimed is:

1. A phase change ink comprising:
   a crystalline component; and
   an amorphous component, wherein the amorphous component comprises a branched alkyl core and a urea functional group.

2. The phase change ink of claim 1, wherein a ratio of the crystalline component to amorphous components ranges from about 9:1 to about 2:1.

3. The phase change ink of claim 1, wherein the amorphous component comprises a compound of formula I:

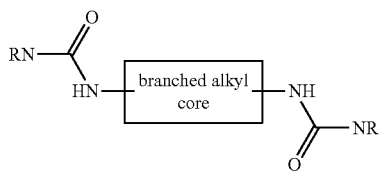

wherein each R is independently selected from a $C_1$ to $C_6$ branched or straight chain alkyl.

4. The phase change ink of claim 3, wherein the compound of formula I is a subgenus of formula II:

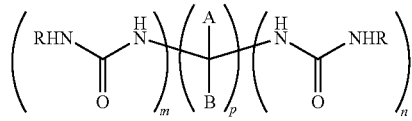

wherein m and n are the integers 0 or 1, provided that both m and n are not both 0;
p is an integer from 2 to 8; and
each occurrence of A and B are independently selected from the group consisting of hydrogen, methyl, and ethyl, provided that at least one occurrence of A or B is not hydrogen.

5. The phase change ink of claim 4, wherein the compound of formula II is a subgenus of formula III:

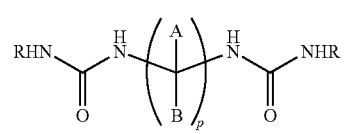

wherein p is an integer from 4 to 6.

6. The phase change ink of claim 5, wherein each R is isoamyl.

7. The phase change ink of claim 5, wherein each R is tert-pentyl.

8. The phase change ink of claim 5, wherein each R is n-butyl.

9. The phase change ink of claim 5, wherein each R is n-propyl.

10. The phase change in of claim 5, wherein each R is sec-butyl.

11. A phase change ink comprising:
    a crystalline component; and
    a urea component, wherein the urea component comprises a branched alkyl core and a urea functional group, wherein a degree of branching of the branched alkyl core is sufficient to provide the urea component that is amorphous.

12. The phase change ink of claim 11, wherein the urea component comprises two urea functional groups.

13. The phase change ink of claim 11, wherein the urea component comprises a compound of formula IV/IV':

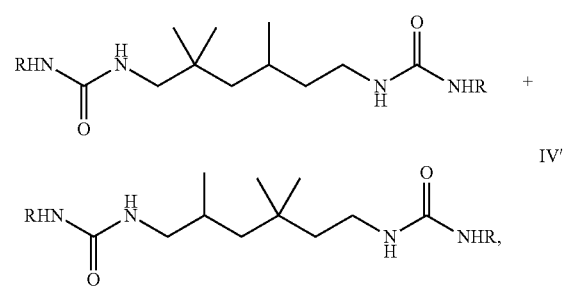

wherein each R is independently selected from a $C_1$ to $C_6$ branched or straight chain alkyl.

14. The phase change ink of claim 13, wherein each R is isoamyl.

15. The phase change ink of claim 13, wherein each R is n-propyl.

16. A phase change ink comprising:
a crystalline component; and
an amorphous component, wherein the amorphous component comprises a branched alkyl core and a urea functional group and wherein the amorphous component has a glass transition temperature in a range from about −15° C. to about 30° C.

17. The phase change ink of claim 16, wherein the amorphous component comprises a compound of formula IV/IV':

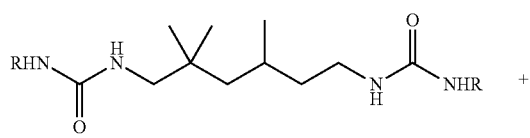

IV

+

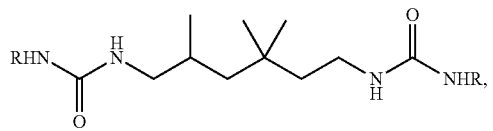

IV' wherein each R is independently selected from a $C_1$ to $C_6$ branched or straight chain alkyl.

18. The phase change ink of claim 17, wherein each R is isoamyl.

19. The phase change ink of claim 17, wherein each R is n-propyl.

* * * * *